United States Patent
Tanaka et al.

(10) Patent No.: US 8,443,986 B2
(45) Date of Patent: May 21, 2013

(54) REVERSE OSMOSIS MEMBRANE AND REVERSE OSMOSIS MEMBRANE APPARATUS

(75) Inventors: Yu Tanaka, Tokyo (JP); Masanobu Osawa, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 45 days.

(21) Appl. No.: 12/733,832

(22) PCT Filed: Sep. 24, 2008

(86) PCT No.: PCT/JP2008/067179
§ 371 (c)(1),
(2), (4) Date: Mar. 23, 2010

(87) PCT Pub. No.: WO2009/044655
PCT Pub. Date: Apr. 9, 2009

(65) Prior Publication Data
US 2011/0168626 A1    Jul. 14, 2011

(30) Foreign Application Priority Data

Oct. 1, 2007   (JP) .................................. 2007-257624
Nov. 13, 2007  (JP) .................................. 2007-294540

(51) Int. Cl.
*B01D 29/00* (2006.01)
*B01D 63/00* (2006.01)

(52) U.S. Cl.
USPC ............ 210/500.42; 210/500.37; 210/500.27; 210/490; 210/500.38

(58) Field of Classification Search
USPC ............ 210/500.27, 500.21, 500.37, 500.42, 210/500.38, 638, 490; 264/48, 232; 521/25, 521/38
See application file for complete search history.

(56) References Cited

U.S. PATENT DOCUMENTS

| | | | | |
|---|---|---|---|---|
| 3,462,362 A * | 8/1969 | Kollsman | ...................... | 210/636 |
| 4,113,912 A * | 9/1978 | Okita | ............................ | 442/118 |
| 4,413,425 A * | 11/1983 | Candor | .......................... | 34/251 |
| 4,753,725 A * | 6/1988 | Linder et al. | .................. | 210/654 |
| 6,177,011 B1 * | 1/2001 | Hachisuka et al. | ...... | 210/500.38 |
| 7,490,725 B2 * | 2/2009 | Pinnau et al. | ................ | 210/490 |
| 2005/0218069 A1* | 10/2005 | Lee et al. | ................ | 210/500.42 |
| 2008/0078718 A1* | 4/2008 | Tada et al. | ................ | 210/500.23 |
| 2009/0032466 A1* | 2/2009 | Kawakatsu et al. | .......... | 210/638 |
| 2009/0191398 A1* | 7/2009 | Moore et al. | ................ | 428/315.5 |
| 2009/0220690 A1* | 9/2009 | Niu et al. | ...................... | 427/245 |

FOREIGN PATENT DOCUMENTS

| | | |
|---|---|---|
| EP | 1808221 A1 * | 7/2007 |
| JP | S51-013388 | 2/1976 |
| JP | S53-028083 | 3/1978 |
| JP | S57-081806 | 5/1982 |

(Continued)

*Primary Examiner* — Ana Fortuna
(74) *Attorney, Agent, or Firm* — Manabu Kanesaka

(57) ABSTRACT

A reverse osmosis membrane that can maintain high permeability for a longer time, a reverse osmosis membrane apparatus, and a hydrophilic treatment method for a reverse osmosis membrane. A reverse osmosis membrane to which poly(vinyl alcohol) is absorbed, wherein the poly(vinyl alcohol) is an ionic poly(vinyl alcohol). Preferably, adsorption of a cationic PVA to the reverse osmosis membrane is followed by adsorption of an anionic PVA. More preferably, an ionic polymer other than PVA is also absorbed to the reverse osmosis membrane. A reverse osmosis membrane apparatus including the reverse osmosis membrane. A hydrophilic treatment method for a reverse osmosis membrane, involving bringing the reverse osmosis membrane into contact with an ionic poly(vinyl alcohol).

12 Claims, 1 Drawing Sheet

FOREIGN PATENT DOCUMENTS

| | | |
|---|---|---|
| JP | S62-197105 | 8/1987 |
| JP | H01-171605 | 7/1989 |
| JP | H02-078426 | 3/1990 |
| JP | H04-176330 | 6/1992 |
| JP | H08-010593 | 1/1996 |
| JP | H11-028466 | 2/1999 |
| JP | H11-319524 | 11/1999 |
| JP | 2006-110520 | 4/2006 |
| WO | WO 2006/043684 A1 | 4/2006 |

* cited by examiner

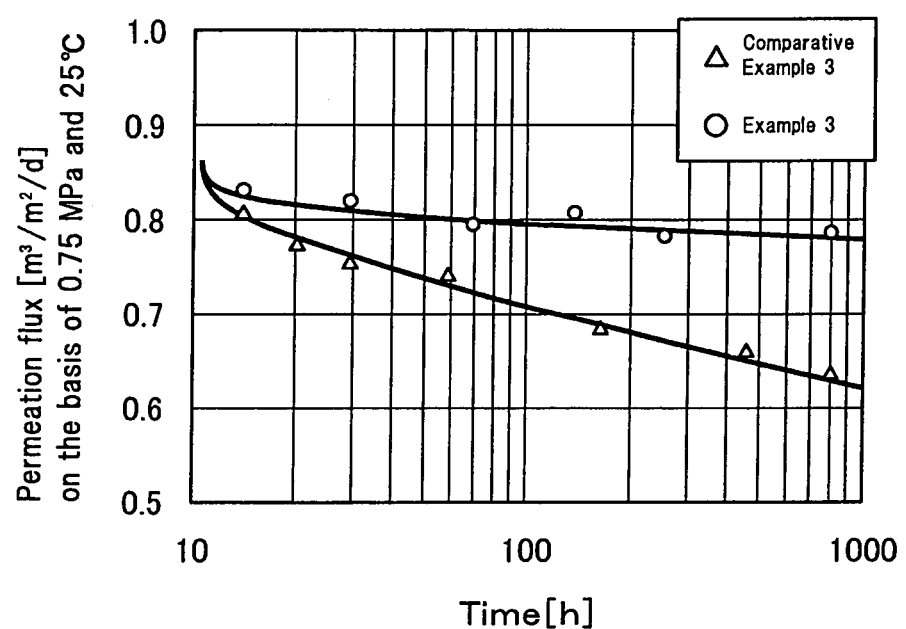

REVERSE OSMOSIS MEMBRANE AND REVERSE OSMOSIS MEMBRANE APPARATUS

RELATED APPLICATIONS

The present application is National Phase of International Application No. PCT/JP2008/067179 filed Sep. 24, 2008, and claims priority from Japanese Applications No. 2007-257624, filed Oct. 1, 2007 and No. 2007-294540, filed Nov. 13, 2007, the disclosure of which is hereby incorporated by reference herein in its entirety.

FIELD OF INVENTION

The present invention relates to a reverse osmosis membrane for use in the reverse osmosis membrane treatment of water, particularly a reverse osmosis membrane to which poly(vinyl alcohol) (hereinafter also referred to as PVA) is absorbed, and a reverse osmosis membrane apparatus including the reverse osmosis membrane. The present invention also relates to a hydrophilic treatment method for a reverse osmosis membrane.

BACKGROUND OF INVENTION

Exploiting their characteristics, reverse osmosis membranes are practically used for desalination, concentration, and the like in various applications. It is known that, in order to prevent reduction in the permeation flux and salt rejection of a reverse osmosis membrane, the reverse osmosis membrane is brought into contact with poly(vinyl alcohol) (PVA) (Patent Documents 1 to 3 cited below). A reverse osmosis membrane brought into contact with PVA becomes hydrophilic and maintains its permeability.

Since poly(vinyl alcohol) (PVA) has many OH groups and is highly hydrophilic, the adsorption of PVA to a reverse osmosis membrane reduces the adsorption of proteins on the reverse osmosis membrane and improves the fouling resistance of the reverse osmosis membrane.

Patent Document 1: Japanese Unexamined Patent Application Publication No. 51-13388
Patent Document 2: Japanese Unexamined Patent Application Publication No. 53-28083
Patent Document 3: Japanese Unexamined Patent Application Publication No. 11-28466

SUMMARY OF INVENTION

It is an object of the present invention to provide a reverse osmosis membrane that can maintain high permeability for a longer time, a reverse osmosis membrane apparatus, and a hydrophilic treatment method for a reverse osmosis membrane.

According to a first aspect, in a reverse osmosis membrane to which poly(vinyl alcohol) is absorbed, the poly(vinyl alcohol) is an ionic poly(vinyl alcohol).

According to a second aspect, in the reverse osmosis membrane according to the first aspect, the ionic poly(vinyl alcohol) has a degree of saponification of 85% or more.

According to a third aspect, in the reverse osmosis membrane according to the first or second aspect, the adsorption of a cationic poly(vinyl alcohol) to the reverse osmosis membrane is followed by the adsorption of an anionic poly(vinyl alcohol).

According to a fourth aspect, in the reverse osmosis membrane according to the third aspect, each of the cationic poly (vinyl alcohol) and the anionic poly(vinyl alcohol) has a degree of polymerization of 200 or more.

According to a fifth aspect, in the reverse osmosis membrane according to any one of the first to fourth aspects, an ionic polymer other than poly(vinyl alcohol) is also absorbed to the reverse osmosis membrane.

According to a sixth aspect, in the reverse osmosis membrane according to the fifth aspect, the adsorption of a cationic polymer to the reverse osmosis membrane as the ionic polymer is followed by the adsorption of an anionic poly(vinyl alcohol).

According to a seventh aspect, in the reverse osmosis membrane according to the fifth aspect, wherein the adsorption of a cationic poly(vinyl alcohol) to the reverse osmosis membrane is followed by the adsorption of an anionic polymer as the ionic polymer.

According to an eighth aspect, in the reverse osmosis membrane according to any one of the fifth to seventh aspects, the adsorption of one of poly(vinyl alcohol) and the ionic polymer and the subsequent adsorption of the other are performed more than once.

According to a ninth aspect, in the reverse osmosis membrane according to any one the fifth to eighth aspects, the ionic polymer has a weight-average molecular weight in the range of 100,000 to 10,000,000.

According to a tenth aspect, in the reverse osmosis membrane according to the fifth to ninth aspects, the ionic polymer is at least one selected from the group consisting of polyvinylamidine, polyvinylamidine derivatives, poly(acrylic acid), poly(acrylic acid) derivatives, poly(styrene sulfonate), and poly(styrene sulfonate) derivatives.

A reverse osmosis membrane apparatus according to an eleventh aspect includes a reverse osmosis membrane according to any one of the first to tenth aspects.

A hydrophilic treatment method for a reverse osmosis membrane according to a twelfth aspect involves bringing the reverse osmosis membrane into contact with an ionic poly (vinyl alcohol).

According to a thirteenth aspect, in the hydrophilic treatment method for a reverse osmosis membrane according to the twelfth aspect, the reverse osmosis membrane is brought into contact with a cationic poly(vinyl alcohol) and then with an anionic poly(vinyl alcohol).

According to a fourteenth aspect, in the hydrophilic treatment method for a reverse osmosis membrane according to the twelfth aspect, the reverse osmosis membrane is brought into contact with one of an ionic poly(vinyl alcohol) and an ionic polymer other than the ionic poly(vinyl alcohol) and then with the other.

As a result of various studies by the inventor, in treatment for improving the permeability of a reverse osmosis membrane by adhering PVA or PVA and a polymer to the reverse osmosis membrane, it was found that use of an ionic PVA as the PVA and an ionic polymer as the polymer can maintain higher permeability for a longer time than use of a nonionic PVA and a nonionic polymer. The present invention is based on such a finding.

It is more effective to make a cationic polymer having a weight-average molecular weight of 100,000 or more be adsorbed on a negatively charged reverse osmosis membrane and then an anionic PVA having a degree of saponification of 85% or more and a degree of polymerization of 200 or more be adsorbed on the cationic polymer. It is also more effective to make a cationic PVA having a degree of saponification of 85% or more and a degree of polymerization of 200 or more and then an anionic polymer having a weight-average molecular weight of 100,000 or more be adsorbed on the cationic PVA. This is because fouling substances (fine particles) in water to be treated are often negatively charged, and a reverse osmosis membrane having an anionic PVA or an anionic polymer on the outermost surface can prevent the adsorption of fouling substances on the reverse osmosis membrane.

Use of a cationic polymer or an anionic polymer having more electric charge than an ionic PVA increases the retainability of the ionic PVA. The adsorption of one of an ionic PVA and an ionic polymer and the subsequent adsorption of the other can be performed more than once to improve the retainability of the ionic PVA. Furthermore, the adsorption of a cationic polymer or an anionic polymer having a weight-average molecular weight of 100,000 or more on a reverse osmosis membrane can improve the salt rejection of the reverse osmosis membrane. The adsorption of a cationic PVA or an anionic PVA having a degree of saponification of 85% or more can improve the fouling resistance of a reverse osmosis membrane. Since a reverse osmosis membrane is often negatively charged, the adsorption of a cationic PVA is preferably performed before the adsorption of an anionic PVA.

BRIEF DESCRIPTION OF DRAWINGS

FIG. 1 is a graph showing changes in permeation flux over time.

BEST MODES FOR CARRYING OUT INVENTION

The present invention will be further described below.

In the present invention, an ionic PVA is absorbed to a reverse osmosis membrane.

The material of a reverse osmosis membrane includes a polyamide reverse osmosis membrane having an aromatic polyamide as a dense layer and may also include a polyamide nanofiltration membrane. Thus, reverse osmosis membranes to be treated in accordance with the present invention are reverse osmosis membranes in a broad sense, including nanofiltration membranes.

Reverse osmosis membranes may have any shapes, such as flat membranes, tubular membranes, spiral membranes, and hollow fiber membranes.

<Ionic PVA>

An ionic PVA to be absorbed to this reverse osmosis membrane may be a cationic PVA or an anionic PVA. In the case that the outermost surface is formed of an ionic PVA, the outermost surface is preferably formed of an anionic PVA. Since fouling substances in water to be treated are generally negatively charged, the outermost surface of a membrane is preferably negatively charged to prevent the adsorption of the fouling substances to the membrane by electrostatic repulsion.

Since a reverse osmosis membrane is often negatively charged, it is desirable that the reverse osmosis membrane be first treated with a cationic PVA to make the cationic PVA be adsorbed on the membrane and then the reverse osmosis membrane be treated with an anionic PVA to make the anionic PVA be adsorbed on the membrane. If a membrane is positively charged, only an anionic PVA may be sufficient.

Treatment with a cationic PVA and an anionic PVA may be alternately performed more than once. Performing more than once is expected to improve the retainability of the ionic PVA but may reduce the permeability (flux) of a membrane.

<Cationic PVA>

As a cationic PVA, for example, a cationic PVA formed by the copolymerization of a vinyl ester, such as vinyl acetate, and a cationic monomer and subsequent hydrolysis (saponification) is preferred.

As a cationic monomer, a monomer having $-NH_2$, $-NHR$, $-NRR'$, $-NH_3^+$, $-NH_2R^+$, $-NHRR'^+$, or $-NRR'R''^+$ (R, R', and R'' denote hydrocarbon residues) is preferred. Specific examples include diallyldimethylammonium salts, acrylates and methacrylates each having an ammonium group, N-substituted methacrylamide, vinylpyridine, quaternary ammonium salts of vinylpyridine, and vinylimidazole.

Commercially available cationic PVAs include C-118, C-506, and C-318 (manufactured by Kuraray Co., Ltd.), and Gohsefimer C-670, Gohsefimer C-820, Gohsefimer K-200, and Gohsefimer K-210 (manufactured by The Nippon Synthetic Chemical Industry Co., Ltd.). Among these, C-506, Gohsefimer C-670, and Gohsefimer K-210 are exemplified.

<Anionic PVA>

Examples of an anionic group of an anionic PVA include a carboxy group, a sulfo group, and a phosphate group. A carboxy group and a sulfo group are preferred in terms of economical viability and manufacturability.

A method for introducing a carboxy group into PVA may be a method involving the copolymerization of an unsaturated basic acid or an unsaturated dibasic acid copolymerizable with a vinyl ester, such as vinyl acetate, an anhydride of the unsaturated basic acid or the unsaturated dibasic acid, or an ester or salt of the unsaturated basic acid or the unsaturated dibasic acid, for example, acrylic acid, methacrylic acid, crotonic acid, maleic acid, fumaric acid, itaconic acid, maleic anhydride, or itaconic anhydride and the saponification of the resulting copolymer. A carboxy-modified PVA may also be manufactured by the saponification of a copolymer of the vinyl ester described above and acrylonitrile, methacrylonitrile, acrylamide, or methacrylamide.

A carboxy group can be introduced into PVA by, as a method involving graft polymerization, the graft polymerization of PVA or a polyvinyl ester, such as poly(vinyl acetate), and acrylonitrile or acrylamide and the saponification of the resulting graft polymer or, as a method, involving a chemical reaction of PVA, the half-esterification reaction of PVA and a dibasic acid, such as maleic acid, fumaric acid, phthalic acid, oxalic acid, malonic acid, succinic acid, adipic acid, or an anhydride thereof.

In the case that a sulfo group is introduced into PVA, a sulfo-group-modified PVA can be obtained by the reaction of PVA and concentrated sulfuric acid or the copolymerization of ethylenesulfonic acid, allylsulfonic acid, methallylsulfonic acid, 2-acrylamide-2-methylpropanesulfonic acid, or an ester or salt thereof and vinyl acetate and the saponification of the resulting copolymer.

Examples of commercially available anionic PVAs include. KL-118, KL-318, KL-506, KM-118, and KM-618 (manufactured by Kuraray Co., Ltd.), and Gohsenal and Gohseran (manufactured by The Nippon Synthetic Chemical Industry Co., Ltd.).

<Degree of Saponification and Degree of Polymerization of Ionic PVA>

An anionic PVA and a cationic PVA preferably have a degree of saponification of 85% or more and a degree of polymerization approximately in the range of 200 to 3000. If the degree of polymerization is lower than this, PVA may pass through a membrane or may be difficult to be adsorbed on a membrane stably (may easily detach). If the degree of saponification is lower than the value described above, hydrophilicity may be lowered, and fouling resistance may be lowered.

The degree of saponification and the degree of polymerization (the average degree of polymerization) are determined in accordance with a method described in JIS K6726-1994.

In the present invention, not only the ionic PVA described above but also an ionic polymer other than the ionic PVA may be absorbed to a reverse osmosis membrane.

<Ionic Polymer>

An ionic polymer to be absorbed to this reverse osmosis membrane may be a cationic polymer or an anionic polymer. In the case that the outermost surface is formed of an ionic polymer, the outermost surface is preferably formed of an anionic polymer. Since fouling substances in water to be treated are generally negatively charged, the outermost surface of a membrane is preferably negatively charged to prevent the adsorption of the fouling substances to the membrane by electrostatic repulsion.

In the case that an ionic polymer is absorbed to a reverse osmosis membrane, preferably, the adsorption of a cationic polymer to the reverse osmosis membrane as the ionic polymer is followed by the adsorption of an anionic poly(vinyl alcohol), or the adsorption of a cationic poly(vinyl alcohol) to the reverse osmosis membrane is followed by the adsorption of an anionic polymer as the ionic polymer.

In the present invention, preferably, the adsorption of one of the ionic poly(vinyl alcohol) and the ionic polymer and the subsequent adsorption of the other are performed more than once. Performing more than once improves the retainability of the ionic PVA.

<Cationic Polymer>

Examples of cationic polymers for use in the present invention include primary amine compounds, such as polyvinylamine, polyallylamine, polyacrylamide, and chitosan, secondary amine compounds, such as polyethyleneimine, tertiary amine compounds, such as poly(dimethylaminoethyl acrylate), poly(dimethylaminoethyl methacrylate), quaternary ammonium compounds, such as polystyrenes to which a quaternary ammonium group is added, and compounds having a heterocycle, such as polyvinylamidine, polyvinylpyridine, polypyrrole, and polyvinyldiazole. A cationic polymer may be a copolymer having a plurality of these structures. Among these, compounds having a heterocycle can be suitably used. In particular, polyvinylamidine and polyvinylamidine derivatives can be suitably used. These may be used alone or in combination.

<Anionic Polymer>

Examples of anionic polymers for use in the present invention include poly(acrylic acid) and derivatives thereof, polymers having a carboxy group, such as poly(methacrylic acid), poly(styrene sulfonate) and derivatives thereof, dextran sulfate, and compounds having a sulfo group, such as polyvinylsulfonic acid. An anionic polymer may be a copolymer having a plurality of these structures. Among these, poly(acrylic acid) and derivatives thereof and poly(styrene sulfonate) and derivatives thereof can be particularly suitably used. These may be used alone or in combination.

Since the sulfo group of poly(styrene sulfonate) is highly anionic, the sulfo group is stably adsorbed on the surface of a permeable membrane, improves the fouling resistance of the permeable membrane, and maintains the improved fouling resistance for a long time, without significantly reducing the permeation rate.

<Weight-Average Molecular Weight of Ionic Polymer>

In the present invention, an ionic polymer preferably has a weight-average molecular weight approximately in the range of 100,000 to 10,000,000, in particular approximately in the range of 1,000,000 to 10,000,000. If the weight-average molecular weight is excessively low, the polymer may pass through a membrane or may be difficult to be adsorbed on a membrane stably. If the weight-average molecular weight is excessively high, an aqueous solution thereof has a high viscosity, so that the water-flow resistance of a permeable membrane may be increased.

In the present invention, the weight-average molecular weight is determined by the gel permeation chromatography of an aqueous polymer solution and, on the basis of the resulting chromatogram, is converted with respect to the molecular weight of a poly(ethylene oxide) standard. For a high molecular weight region in which a poly(ethylene oxide) stand is not available, the weight-average molecular weight is determined by a light scattering method or an ultracentrifugation method.

<Method for Adhering Ionic PVA and Ionic Polymer to Reverse Osmosis Membrane>

In order to adhere an ionic PVA and an ionic polymer to a reverse osmosis membrane, aqueous solutions of the ionic PVA and the ionic polymer may be brought into contact with the reverse osmosis membrane. In particular, aqueous solutions of the ionic PVA and the ionic polymer are preferably passed through the reverse osmosis membrane. In this case, a solute, the ionic PVA, is preferably blocked by the reverse osmosis membrane and absorbed to a surface, particularly a surface on the upstream side in the flow direction, of the reverse osmosis membrane.

The operating conditions (pressure, permeation flux, etc.) for this permeabilization treatment is preferably similar to the operating conditions for reverse osmosis treatment. Thus, the appropriate operating conditions depend on the type of a reverse osmosis membrane element to be treated. For example, the pressure is as follows:

Nitto Denko Co. NTR-759HR: 1.47 MPa
Nitto Denko Co. ES20-D: 0.735 MPa
Toray Industries, Inc. SU-720: 1.47 MPa
Toray Industries, Inc. SUL-G20: 0.74 MPa
FilmTec BW-30-8040: 1.47 MPa
Desalination 8137UP: 1.37 MPa In the case that a cationic PVA and an anionic PVA are individually absorbed to a reverse osmosis membrane and that a film surface is anionic (many of commonly used reverse osmosis membranes are more or less anionic), first, 0.5 to 5 mg/L cationic PVA, pure water, and 0.5 to 5 mg/L anionic PVA are passed through the reverse osmosis membrane for 0.5 to 10 hours, 0 to 5 hours, and 0.5 to 10 hours, respectively, at 0.25 to 5 MPa.

In the case that a cationic polymer and an anionic PVA are individually absorbed to a reverse osmosis membrane and that a film surface is anionic (many of commonly used reverse osmosis membranes are more or less anionic), first, 0.5 to 5 mg/L cationic polymer, pure water, and 0.5 to 5 mg/L anionic PVA are passed through the reverse osmosis membrane for 0.5 to 10 hours, 0 to 5 hours, and 0.5 to 10 hours, respectively, at 0.25 to 5 MPa.

In the case that a cationic PVA and an anionic polymer are individually absorbed to a reverse osmosis membrane and that a film surface is anionic (many of commonly used reverse osmosis membranes are more or less anionic), first, 0.5 to 5 mg/L cationic PVA, pure water, and 0.5 to 5 mg/L anionic polymer are passed through the reverse osmosis membrane for 0.5 to 10 hours, 0 to 5 hours, and 0.5 to 10 hours, respectively, at 0.25 to 5 MPa.

In the case that the film surface of a reverse osmosis membrane is cationic, 0.5 to 5 mg/L anionic PVA is preferably passed through the reverse osmosis membrane at 0.25 to 5 MPa for 0.5 to 10 hours.

Adsorption treatment of a reverse osmosis membrane with an ionic PVA or an ionic PVA and an ionic polymer may be performed to a new reverse osmosis membrane or may be performed to an in-use reverse osmosis membrane during the interruption of a water treatment process.

<Amount of Absorbed Ionic PVA and Ionic Polymer>

Preferably, an ionic PVA is absorbed to the surface of a reverse osmosis membrane at approximately 5 to 50 mg/m$^2$. If the adsorption of a cationic PVA to a reverse osmosis membrane is followed by the adsorption of an anionic PVA, preferably, the cationic PVA is absorbed at approximately 5 to 50 mg/m$^2$, and then the anionic PVA is absorbed at approximately 5 to 50 mg/m$^2$.

Preferably, an ionic polymer is absorbed to the surface of a reverse osmosis membrane at approximately 5 to 50 mg/m$^2$. If the adsorption of a cationic polymer to a reverse osmosis membrane is followed by the adsorption of an anionic PVA, preferably, the cationic polymer is absorbed at approximately 5 to 50 mg/m$^2$, and then the anionic PVA is absorbed at approximately 5 to 50 mg/m$^2$.

If the adsorption of a cationic PVA to a reverse osmosis membrane is followed by the adsorption of an anionic polymer, preferably, the cationic PVA is absorbed at approximately 5 to 50 mg/m$^2$, and then the anionic polymer is absorbed at approximately 5 to 50 mg/m$^2$.

<Type of Reverse Osmosis Membrane Module>

A reverse osmosis membrane module that includes a reverse osmosis membrane according to the present invention may be of any type, for example, a tubular membrane, a flat membrane, a spiral membrane, or a hollow fiber membrane.

EXAMPLES

Examples and comparative examples of the present invention will be described below.

Ionic PVAs and ionic polymers used in the following examples are as follows:

Cationic PVA (Gohsefimer K-210)
Saponified copolymer of vinyl acetate and diallyldimethylammonium chloride
The degree of polymerization=1800 and the degree of saponification=86.7%

Anionic PVA (i) (Gohsenal T-330H)
Saponified copolymer of vinyl acetate and monomethyl maleate
The degree of polymerization=1800 and the degree of saponification=99.1%

Anionic PVA (ii) (Gohseran L-3266)
Saponified copolymer of vinyl acetate and alkenyl (C=2 to 4) sulfonate
The degree of polymerization=300 and the degree of saponification=87.5%

Cationic polymer (Kurifix CP-III manufactured by Kurita Water Industries Ltd.)
Polyvinylamidine
The weight-average molecular weight=approximately 3,500,000

A nonionic PVA used in Comparative Example 2 is as follows:
Nonionic PVA (N-type Gohsenol NM-14)
The degree of polymerization=1500 and the degree of saponification=99.2%

Waste water from Kurita Global Technology Center subjected to biological treatment and coagulating sedimentation, then passed through an activated carbon column, and filtered through a microfiltration (MF) membrane was used as raw water.

Comparative Example 1

The raw water described above was passed through a flat membrane type test cell including a polyamide reverse osmosis membrane (ES20 manufactured by Nitto Denko Co., φ32 mm) at 0.74 MPa. Table 1 shows changes in permeation flux over time.

Example 1

After 1 mg/L cationic PVA described above was passed through the same reverse osmosis membrane module as in Comparative Example 1 at 0.74 MPa and at 60 ml/h for two hours, pure water was passed through at 0.74 MPa and at 60 ml/h for 30 minutes, and then 1 mg/L anionic PVA (i) was passed through at 0.74 MPa and at 60 ml/h for five hours.

The raw water was passed through this reverse osmosis membrane module under the same conditions as in Comparative Example 1. Table 1 shows changes in permeation flux over time.

Example 2

One mg/L anionic PVA (i) was passed through the same reverse osmosis membrane module as in Comparative Example 1 at 0.74 MPa and at 60 ml/h.

The raw water was passed through this reverse osmosis membrane module under the same conditions as in Comparative Example 1. Table 1 shows changes in permeation flux over time.

Comparative Example 2

One mg/L aqueous nonionic PVA solution was passed through the same reverse osmosis membrane module as in Comparative Example 1 at 0.75 MPa and at 60 ml/h.

The raw water was passed through this reverse osmosis membrane module under the same conditions as in Comparative Example 1. Table 1 shows changes in permeation flux over time.

TABLE 1

| | Permeation flux [m$^3$/m$^2$/d] | | | |
|---|---|---|---|---|
| Time (h) | Comparative Example 1 | Example 1 | Example 2 | Comparative Example 2 |
| 100 | 0.72 | 0.80 | 0.77 | 0.75 |
| 300 | 0.66 | 0.79 | 0.73 | 0.71 |
| 500 | 0.63 | 0.77 | 0.70 | 0.66 |
| 700 | 0.60 | 0.74 | 0.67 | 0.63 |
| 1000 | 0.55 | 0.73 | 0.63 | 0.58 |
| 1500 | 0.51 | 0.70 | 0.59 | 0.54 |
| 2000 | 0.47 | 0.68 | 0.55 | 0.50 |
| PVA treatment | None | Cationic PVA + anionic PVA (i) | Anionic PVA (i) alone | Nonionic PVA |

(on the basis of 0.75 MPa and 25° C.)

Table 1 shows that the permeation flux can be kept high for a long time in accordance with the present invention.

Comparative Example 3

The raw water was passed through a flat membrane type test cell including a polyamide reverse osmosis membrane (ES20 manufactured by Nitto Denko Co., φ32 mm) under the same conditions as in Comparative Example 1. FIG. 1 shows changes in permeation flux over time.

Example 3

After 1 mg/L cationic polymer described above was passed through the same reverse osmosis membrane module as in Comparative Example 3 at 0.75 MPa and at 60 ml/h for two hours, pure water was passed through at 0.75 MPa and at 60 ml/h for 30 minutes, and then 1 mg/L anionic PVA (ii) was passed through at 0.75 MPa and at 60 ml/h for five hours.

The raw water was passed through this reverse osmosis membrane module under the same conditions as in Comparative Example 3. FIG. 1 shows changes in permeation flux over time.

FIG. 1 clearly shows that the decrease in permeation flux is reduced for a long time in the reverse osmosis membrane treated with the cationic polymer and the anionic PVA.

While the present invention was described in detail with particular embodiments, it is apparent to a person skilled in the art that various modifications can be made without departing from the spirit and the scope of the present invention.

The present application is based on Japanese Patent Application (Japanese Patent Application No. 2007-257624) filed on Oct. 1, 2007 and Japanese Patent Application (Japanese Patent Application No. 2007-294540) filed on Nov. 13, 2007, which are incorporated herein by reference in their entirety.

The invention claimed is:

1. A reverse osmosis membrane, comprising:
   a reverse osmosis base membrane;
   a cationic poly(vinyl alcohol) adsorbed on the reverse osmosis base membrane; and
   an anionic poly(vinyl alcohol) adsorbed on the cationic poly(vinyl alcohol).

2. The reverse osmosis membrane according to claim 1, wherein the cationic poly(vinyl alcohol) and the anionic poly(vinyl alcohol) have a degree of saponification of 85% or more.

3. The reverse osmosis membrane according to claim 1, wherein each of the cationic poly(vinyl alcohol) and the anionic poly(vinyl alcohol) has a degree of polymerization of 200 or more.

4. A reverse osmosis membrane apparatus, comprising a reverse osmosis membrane according to claim 1.

5. A reverse osmosis membrane, comprising:
   a reverse osmosis base membrane;
   a cationic polymer except poly(vinyl alcohol) adsorbed on the reverse osmosis base membrane; and
   an anionic poly(vinyl alcohol) adsorbed on the cationic polymer.

6. The reverse osmosis membrane according to claim 5, wherein an adsorption of the cationic polymer on the reverse osmosis base membrane followed by another adsorption of the anionic poly(vinyl alcohol) are performed more than once.

7. The reverse osmosis membrane according to claim 5, wherein the cationic polymer has a weight-average molecular weight in the range of 100,000 to 10,000,000.

8. The reverse osmosis membrane according to claim 5, wherein the cationic polymer is at least polyvinylamidine or polyvinylamidine derivatives.

9. A reverse osmosis membrane, comprising:
   a reverse osmosis base membrane;
   a cationic poly(vinyl alcohol) adsorbed on the reverse osmosis base membrane; and
   an anionic polymer except poly(vinyl alcohol) adsorbed on the cationic poly(vinyl alcohol).

10. The reverse osmosis membrane according to claim 9, wherein an adsorption of the cationic poly(vinyl alcohol) on the reverse osmosis base membrane followed by another adsorption of the anionic polymer are performed more than once.

11. The reverse osmosis membrane according to claim 9, wherein the anionic polymer has a weight-average molecular weight in the range of 100,000 to 10,000,000.

12. The reverse osmosis membrane according to claim 9, wherein the anionic polymer is at least one selected from the group consisting of poly(acrylic acid), poly(acrylic acid) derivatives, poly(styrene sulfonate), and poly(styrene sulfonate) derivatives.

* * * * *